United States Patent
Tsai et al.

(10) Patent No.: US 9,197,614 B2
(45) Date of Patent: Nov. 24, 2015

(54) RADIO-FREQUENCY IDENTIFICATION READER

(75) Inventors: Chun-Liang Tsai, Pingtung (TW); Shao-Chang Chang, Jhubei (TW)

(73) Assignee: FAVEPC Inc., Jhubei, Hsinchu County (TW)

( * ) Notice: Subject to any disclaimer, the term of this patent is extended or adjusted under 35 U.S.C. 154(b) by 923 days.

(21) Appl. No.: 13/422,590

(22) Filed: Mar. 16, 2012

(65) Prior Publication Data

US 2013/0241711 A1 Sep. 19, 2013

(51) Int. Cl.
*H04Q 5/22* (2006.01)
*H04L 29/06* (2006.01)
*H04W 4/00* (2009.01)

(52) U.S. Cl.
CPC ........ *H04L 63/0492* (2013.01); *H04L 63/0838* (2013.01); *H04W 4/008* (2013.01)

(58) Field of Classification Search
CPC ............ G06K 7/0008; G06K 7/10227; G06Q 20/203; G06Q 20/3278; G07C 9/00111
USPC ............................ 340/10.31–10.52, 5.8–5.86
See application file for complete search history.

(56) References Cited

U.S. PATENT DOCUMENTS

| | | | | |
|---|---|---|---|---|
| 5,023,908 | A * | 6/1991 | Weiss | 713/184 |
| 6,857,564 | B1 * | 2/2005 | Takemoto et al. | 235/380 |
| 7,124,943 | B2 * | 10/2006 | Quan et al. | 235/451 |
| 7,295,114 | B1 * | 11/2007 | Drzaic et al. | 340/572.1 |
| 7,494,062 | B2 | 2/2009 | Holz et al. | |
| 8,115,590 | B1 | 2/2012 | Diorio et al. | |
| 8,154,405 | B2 * | 4/2012 | Gravelle et al. | 340/572.1 |
| 8,847,761 | B1 * | 9/2014 | Claudatos et al. | 340/572.1 |
| 2004/0145474 | A1 | 7/2004 | Schmidtberg et al. | |
| 2006/0000902 | A1 * | 1/2006 | Strawn et al. | 235/382 |
| 2006/0065730 | A1 * | 3/2006 | Quan et al. | 235/451 |
| 2006/0131375 | A1 * | 6/2006 | Myllymaki | 235/375 |
| 2007/0120651 | A1 * | 5/2007 | Kobayashi et al. | 340/10.51 |
| 2007/0206797 | A1 | 9/2007 | Chan et al. | |
| 2008/0083832 | A1 * | 4/2008 | Chang et al. | 235/492 |
| 2008/0191878 | A1 * | 8/2008 | Abraham | 340/572.1 |
| 2008/0238676 | A1 * | 10/2008 | Dhillon et al. | 340/572.1 |
| 2010/0070966 | A1 * | 3/2010 | Perng et al. | 717/173 |
| 2010/0141402 | A1 * | 6/2010 | Eun et al. | 340/10.41 |
| 2010/0164687 | A1 * | 7/2010 | Perng et al. | 340/10.1 |
| 2010/0259388 | A1 * | 10/2010 | Menzel | 340/572.1 |
| 2014/0302819 | A1 * | 10/2014 | McKelvey | 455/411 |

* cited by examiner

*Primary Examiner* — Fekadeselassie Girma
*Assistant Examiner* — Son M Tang
(74) *Attorney, Agent, or Firm* — Alston & Bird LLP

(57) ABSTRACT

An RFID reader comprises a memory having a first data for identifying the reader and a second data associated with the first data stored therein; a communication interface; and a microcontroller unit. The microcontroller unit is configured to transmit the first data via the communication interface; receive a first request for transmitting the second data; transmit the second data via the communication interface; receive a third data via the communication interface; overwrite the second data stored in the memory with third data.

18 Claims, 5 Drawing Sheets

RADIO-FREQUENCY IDENTIFICATION READER

BACKGROUND OF THE INVENTION

The present invention relates generally to radio-frequency identification (RFID) readers and, more particularly, to secured RFID readers and systems and methods for authenticating the secured readers.

Systems, devices and methods for providing and obtaining product information by producers and consumers, respectively, are continuously being improved for their efficiencies, convenience and security. For instance, a producer may use a reader to scan an electronic label of a product, and upload product information of that product to a server. On the other end, a consumer may also use a reader to scan an electronic label of the same product, and retrieve the product information uploaded by the producer from the server. The security features for uploading and downloading product information are generally implemented in the electronic labels, laser labels, or quick response (QR) code, which the reader scans.

Methods as such, however, do not provide security features on the reader. Specifically, readers are not authenticated during information uploading or downloading process. As a result, an imitation of a reader may be designed to bypass the security features implemented in the electronic labels, laser labels or QR code, and upload false product information or illegally download product information. In other words, the conventional information uploading and downloading systems using readers are not secure.

BRIEF SUMMARY OF THE INVENTION

Examples of the present invention may provide an RFID reader that comprises a memory having a first data for identifying the reader and a second data associated with the first data stored therein; a communication interface; and a microcontroller unit. The microcontroller unit is configured to transmit the first data via the communication interface; receive a first request for transmitting the second data; transmit the second data via the communication interface; receive a third data via the communication interface; and overwrite the second data stored in the memory with third data.

Some examples of the present invention may also provide a system that comprises a first reader and a server. The first reader comprises a first memory having a first reader ID for identifying the first reader and a first secure code associated with the first reader ID stored therein. The server comprises a second memory having a plurality of reader IDs and a plurality of secure codes stored therein. Each reader ID is associated with one of a plurality of readers, and each secure code is associated with one of the plurality of reader IDs. The system is configured to transmit, by the reader, the first reader ID to the server; identify, by the server, the first reader ID from the plurality of reader IDs; receive, by the reader, a request for transmitting the secure code associated with the first reader ID from the server; transmit, by the reader, the first secure code to the server; determine, by the server, whether or not the first secure code matches the secure code associated with the first reader ID stored in the second memory; generate, by the server, a new secure code if the first secure code matches the secure code associated with the first reader ID stored in the second memory; transmit, by the server to the reader, the new secure code; and overwrite, by the reader, the first secure code with the new secure code.

Other objects, advantages and novel features of the present invention will be drawn from the following detailed embodiments of the present invention with attached drawings.

BRIEF DESCRIPTION OF THE SEVERAL VIEWS OF THE DRAWINGS

The foregoing summary as well as the following detailed description of the preferred examples of the present invention will be better understood when read in conjunction with the appended drawings. For the purposes of illustrating the invention, there are shown in the drawings examples which are presently preferred. It is understood, however, that the invention is not limited to the precise arrangements and instrumentalities shown. In the drawings.

DETAILED DESCRIPTION OF THE INVENTION

Reference will now be made in detail to the present examples of the invention illustrated in the accompanying drawings. Wherever possible, the same reference numbers will be used throughout the drawings to refer to the same or like portions. It should be noted that the drawings are made in simplified form and are not drawn to precise scale.

Figure 1:
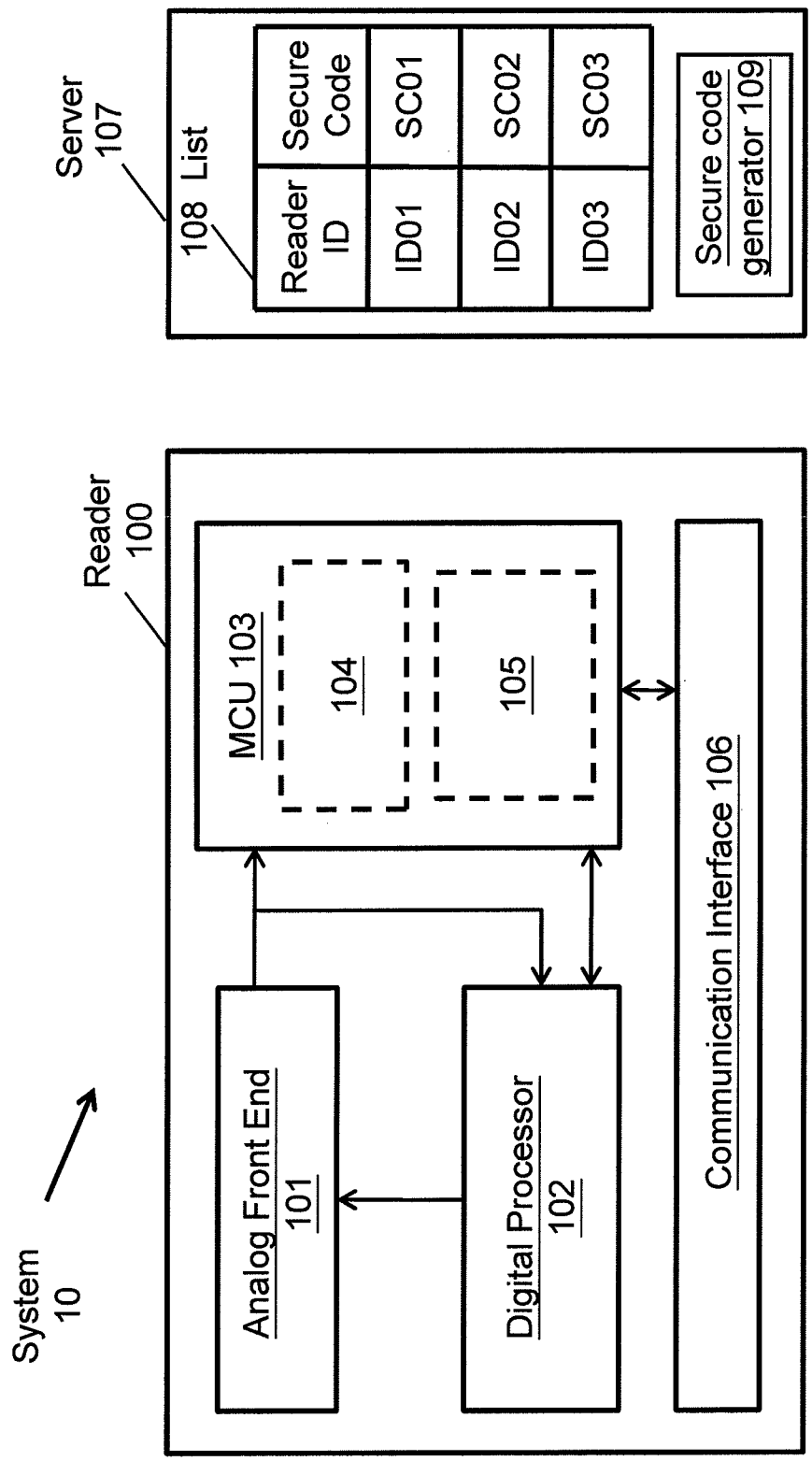
FIG. 1 is a block diagram illustrating a system 10 for authenticating an RFID reader 100 in accordance with an example of the present invention.

FIG. 1 is a block diagram illustrating a system 10 for authenticating an RFID reader 100 in accordance with an example of the present invention. The system 10 comprises the RFID reader 100 and a server 107. The RFID reader 100 is in communication with the server 107 via a mobile communication network or the Internet.

The RFID reader 100 may comprise an analog front end 101 for transmitting and receiving radio-frequency (RF) signals to and from an RFID tag. The analog front end 101 is managed by a digital processor 102 and is configured to transmit the received RF signals to the digital processor 102 and a microcontroller unit (MCU) 103.

Each RFID reader 100 is associated with a unique reader identification (ID), and each reader ID is associated with a secure code. The reader ID and the secure code associated with each reader may be pre-assigned by the manufacturer, and are stored in a memory of the RFID reader 100. For example, the reader ID may be stored in a first memory block 104 of the MCU 103, and the secure code may be stored in a second memory block 105 of the MCU 103. In another example in accordance with the present invention, the reader ID and the secure code may be stored in a memory external to the MCU 103.

The MCU 103 is electrically connected with a communication interface 106. The communication interface 106 is configured to allow the RFID reader 100 to communicate with the server 107 over a mobile communication network or the Internet. For example, the communication interface 106 may comprise an antenna for communicating with the server 107 over a mobile communication network, such as a general packet radio service (GPRS) network, a second generation (2G) mobile communication network, a third generation (3G) mobile communication network, a fourth generation (4G) mobile communication network, etc.

In accordance with another example of the present invention, the communication interface 106 may comprise hardware for connecting the RFID reader 100 to the Internet via landline, cable or a wireless protocol.

The server 107 stores a list 108 of reader IDs ID01, ID02, ID03 and their respective secure codes SC01, SC02, SC03 and comprises a secure code generator 109. The secure code generator 109 is configured to generate new secure codes. For example, the new secure code may be generated based on a reader ID and the associated secure code.

Figure 2:
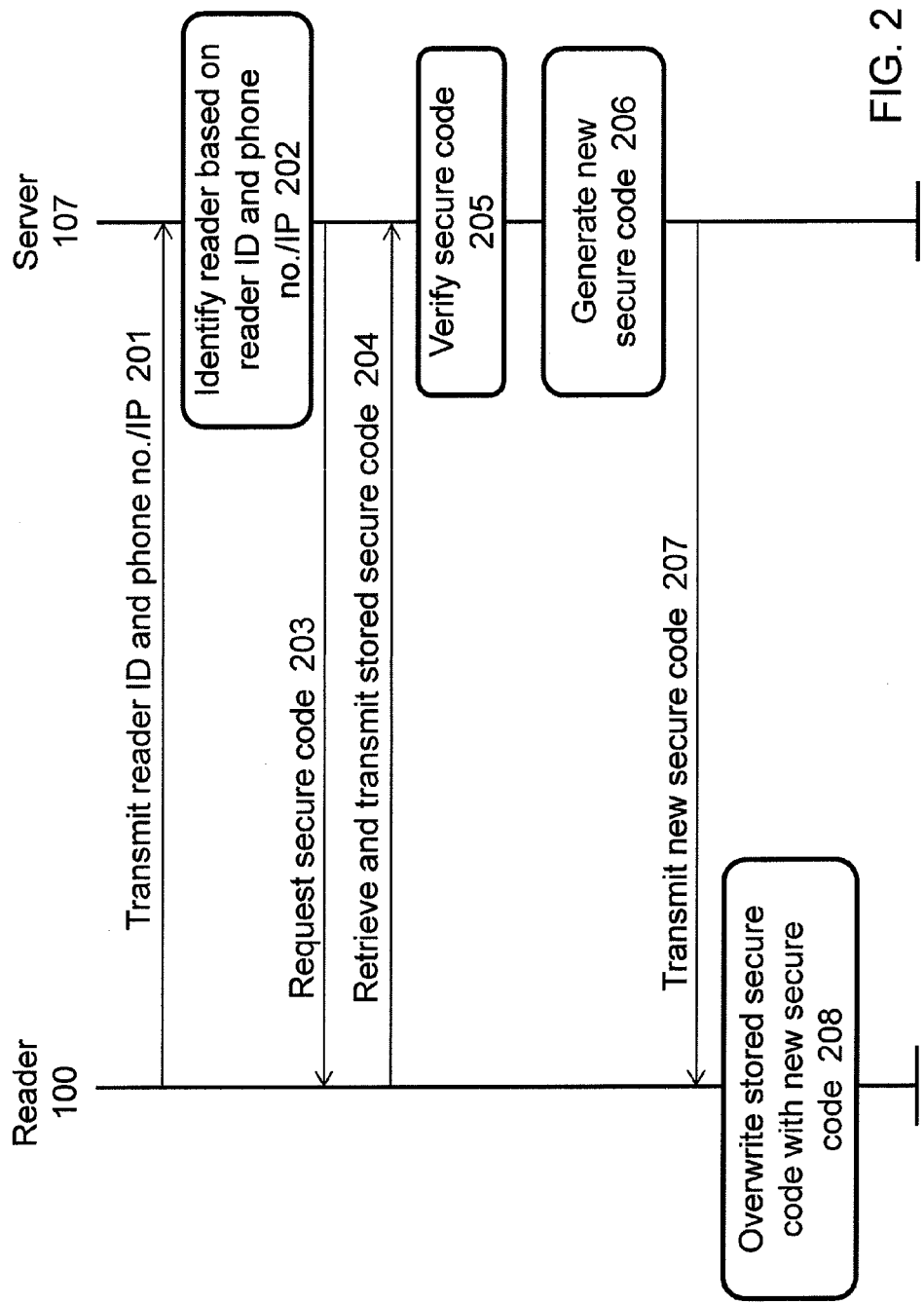
FIG. 2 is a flowchart illustrating signaling flow of an RFID reader 100 authentication process in the system 10 illustrated in FIG. 1.

FIG. 2 is a flowchart illustrating signaling flow of a reader authentication process in the system 10 illustrated in FIG. 1. First, in step 201, the RFID reader 100 may send a first data, which comprises the reader ID, to the server via the communication interface 106, so that the server 107 may identify the RFID reader 100 by matching the received reader ID with the reader IDs ID01, ID02, ID03 in the list 108.

In accordance with an example of the present invention, a second data for identifying the reader may also be sent to the server. For example, the RFID reader 100 may be disposed in a NFC-enable mobile device. Therefore, the second data sent to the server 107 may comprise the phone number of the mobile device. In another example, the RFID reader 100 may be disposed in a computing device connected to the Internet. In this instance, the second data may comprise the Internet Protocol address (IP address) of the computing device. In yet another example in accordance with the present invention, where the RFID reader 100 is implemented in a mobile device that is also connected to the Internet, the second data sent to the server 107 may comprise both the phone number and the IP address of the mobile device.

Upon receiving the data from the RFID reader 100, the server 107 identifies the RFID reader 100 from the list 108 based on the received data in step 202, and sends a request to the RFID reader 100 for the associated secure code in step 203, if the RFID reader 100 is identified from the list 108. In response to the request from the server 107, in step 204, the MCU 103 of the RFID reader 100 retrieves the secure code from the second memory block 105, and sends the secure code to the server 107. After receiving the secure code, the server 107, in step 205, checks the list 108 to determine whether or not the received secure code matches the secure code associated with the identified RFID reader in the list 108. If the secure code received matches the secure code in the list associated with the identified reader, the server 107, in step 206, generates a new secure code, and updates the list with the new secure code. The new secure code is sent to the RFID reader 100 in step 207 and the RFID reader 100 replaces the secure code stored in the second memory block 105 with the new secure code in step 208.

On the other hand, if the received secure code does not match the secure code associated with the identified reader in the list 108, the reader is determined to be an imitation. Actions to deny further access to the server by the reader may be taken.

The authentication of the RFID reader 100 as described above may be carried out, for example, before a producer uploads product information using his reader, or before a consumer downloads product information using his reader. Therefore, the secure code is renewed each time the user starts a session for uploading or downloading product information, and thus increases the security of the information uploading and downloading system.

Figure 3:
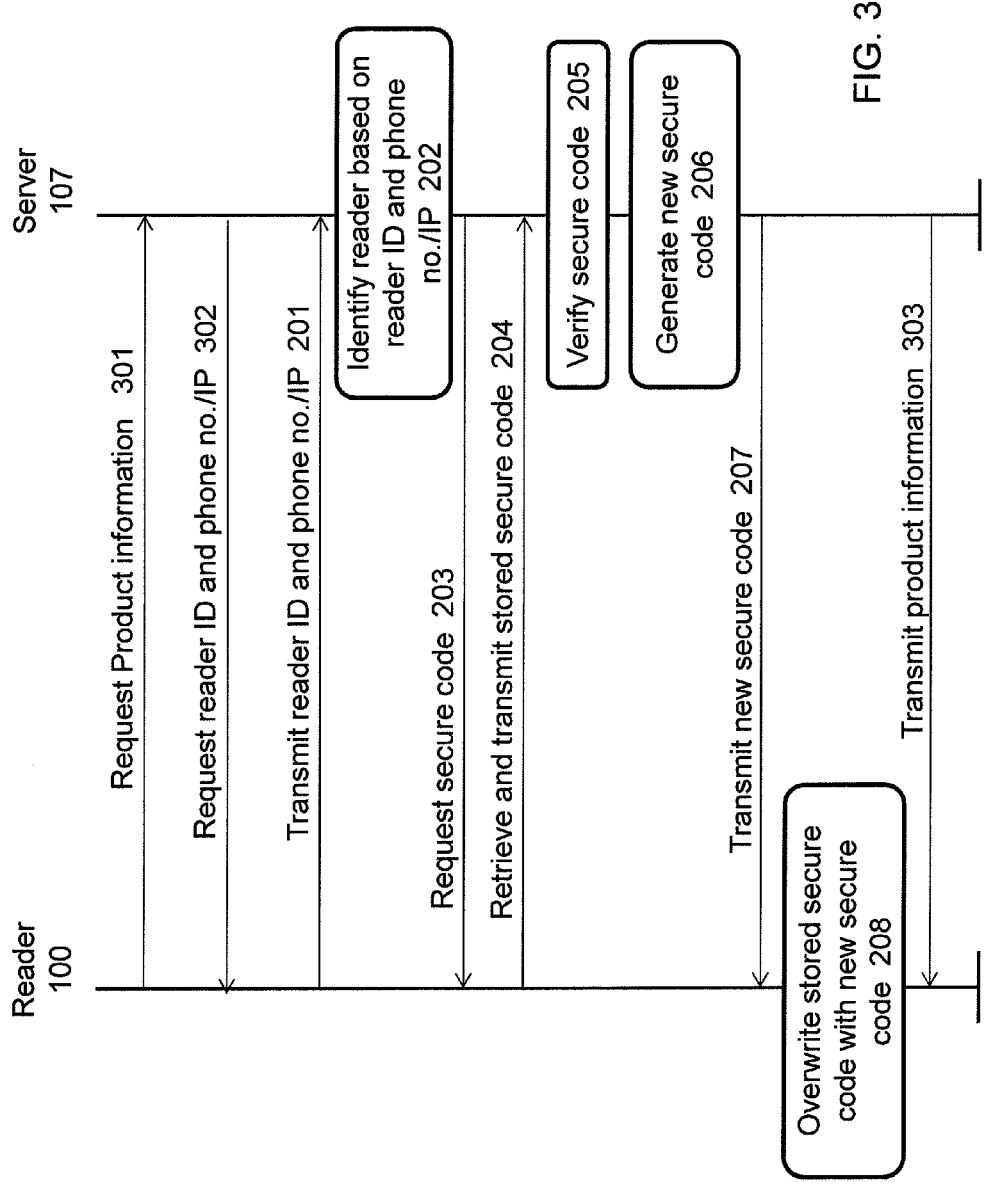
FIG. 3 is a flowchart illustrating signaling flow of a product information downloading process in the system 10 illustrated in FIG. 1.

FIG. 3 is a flowchart illustrating signaling flow of a product information downloading process in the system 10 illustrated in FIG. 1. The signaling flow for authenticating the RFID reader 100 in FIG. 3 is similar to the signaling flow in FIG. 2. In addition to the steps in FIG. 2, in order for a user to download production information from the server 107, first, in step 301, the RFID reader 100 sends a request to the server 107 for downloading production information. In response to the request from the RFID reader 100, the server 107 sends a request to the RFID reader 100 for identification information, such as reader ID and may further include at least one of a phone number and IP address of the RFID reader 100. Subsequently, the process for authenticating the RFID reader 100 as described in reference to FIG. 2 is carried out. After the secure code in the second memory block 105 is replaced by the new secure code generated by the server 107, the RFID reader 100 may start to download product information from the server 107 in step 303. In other examples in accordance with the present invention, the product information requested by the RFID reader 100 in step 301 may be sent to the RFID reader 100 along with the new secure code in step 207.

Figure 4:
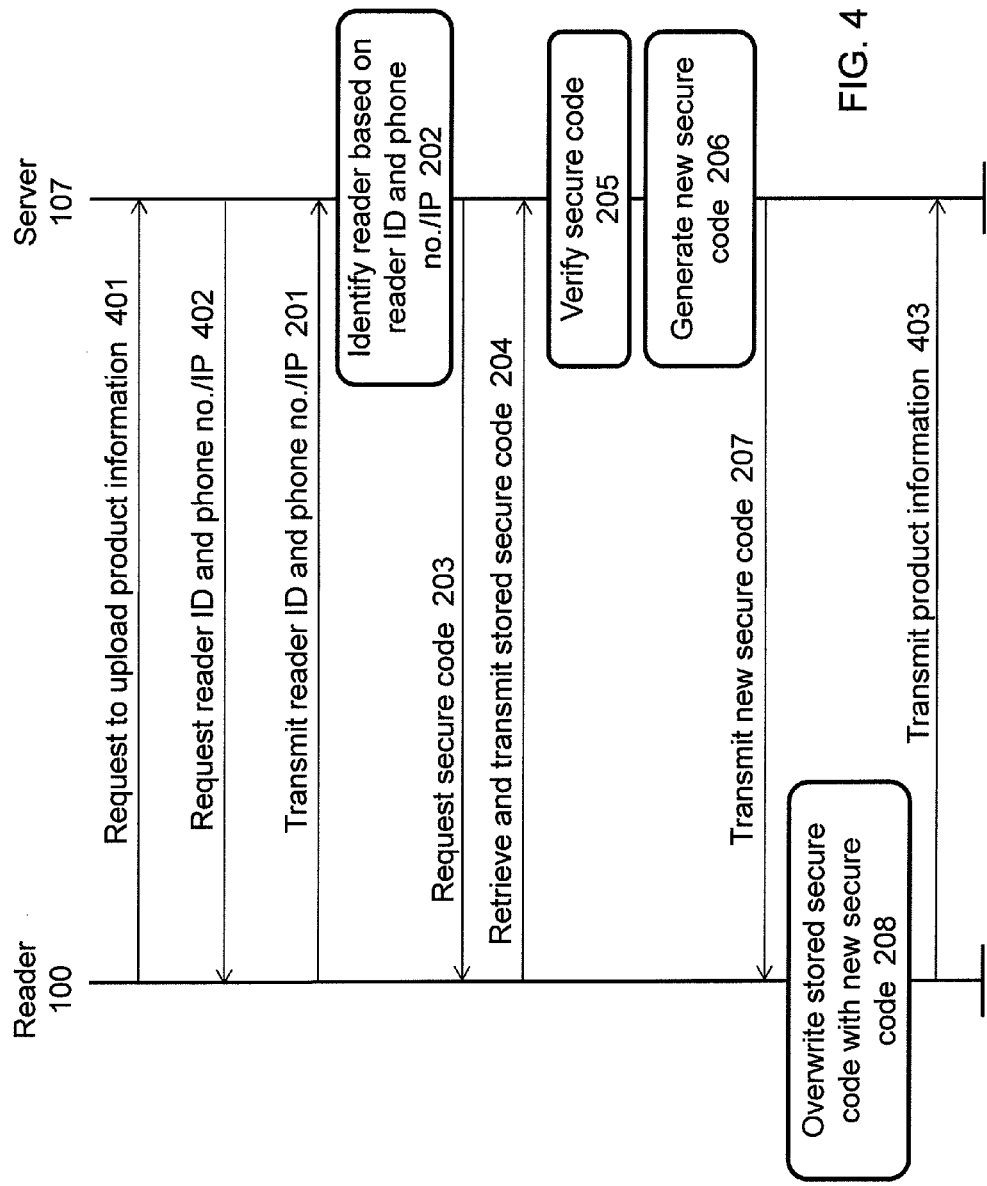
FIG. 4 is a flowchart illustrating signaling flow of a product information uploading process in the system 10 illustrated in FIG. 1.

FIG. 4 is a flowchart illustrating signaling flow of a product information uploading process in the system 10 illustrated in FIG. 1. The signaling flow for authenticating the RFID reader 100 in FIG. 4 is similar to the signaling flow in FIG. 2. In addition to the steps in FIG. 2, in order for a producer to upload production information to the server 107, first, in step 401, the RFID reader 100 sends a request to the server 107 for uploading production information. In response to the request from the RFID reader 100, the server 107 sends a request to the RFID reader 100 for identification information, such as reader ID and may further include at least one of a phone number and IP address of the RFID reader 100. Subsequently, the process for authenticating the RFID reader 100 as described in reference to FIG. 2 is carried out. After the secure code in the second memory block 105 is replaced by the new secure code generated by the server 107, the RFID reader 100 may start to upload product information to the server 107 in step 403.

Figure 5:
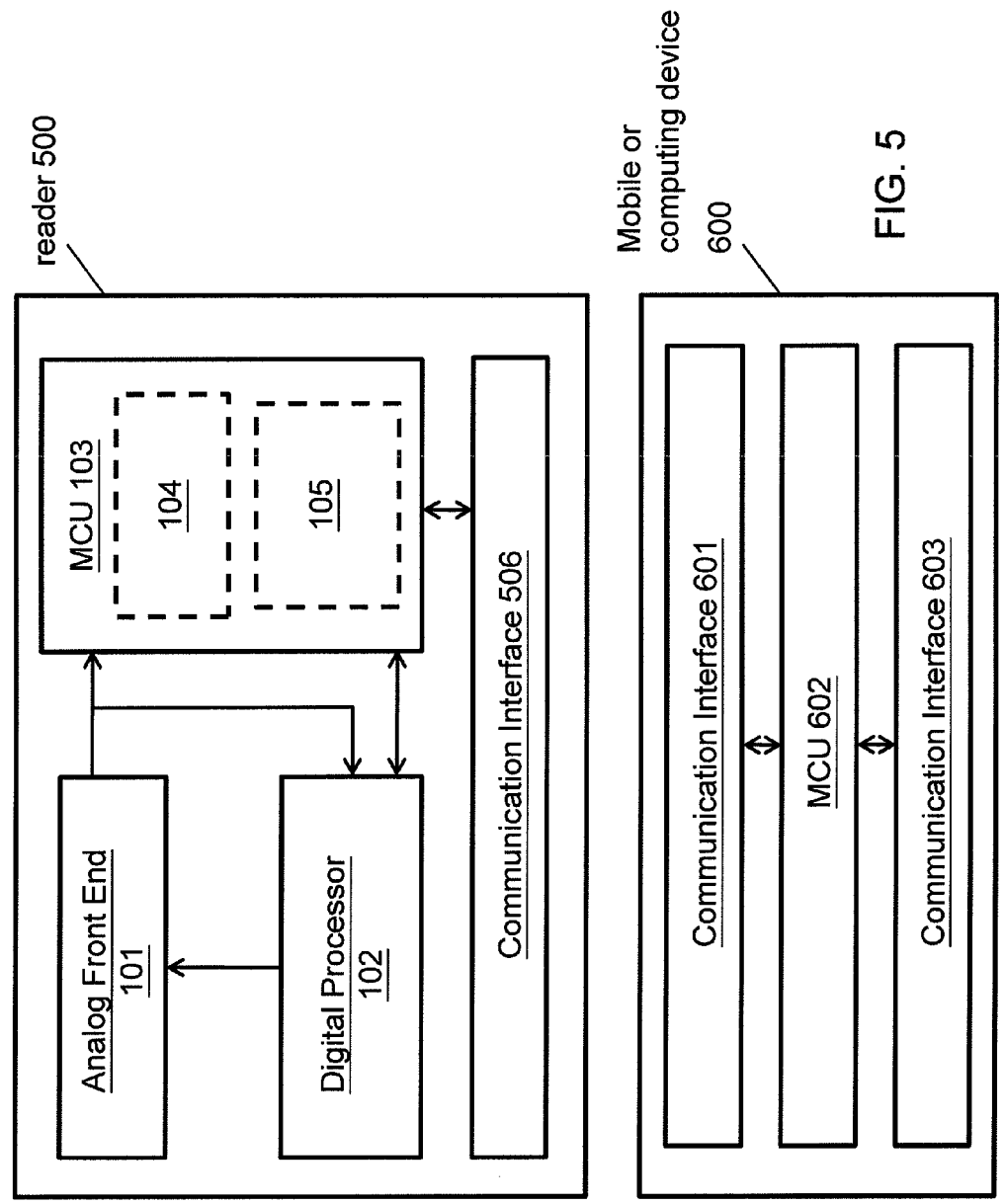
FIG. 5 is a block diagram illustrating an RFID reader 100 in accordance with another example of the present invention.

FIG. 5 is a block diagram illustrating a reader 500 in accordance with another example of the present invention. The reader 500 illustrated in FIG. 5 is similar to the RFID reader 100 illustrated in FIG. 1 except that the reader 500 in FIG. 5 comprises a communication interface 506 for establishing communication with a mobile or computing device 600. The mobile or computing device 600 comprises a communication interface 601 for communication with the reader 500 via the communication interface 506. For example, the communication interfaces 506 and 601 may comprise a wireless communication interface such as a Bluetooth interface, or a Universal Serial Bus (USB) type connection including but not limited to micro USB, mini USB and USB connectors.

The mobile or computing device 600 further comprises a communication interface 603 for establishing communication with a mobile communication network or the Internet, and a MCU 602 for managing the signaling between the two communication interfaces 601 and 603.

The reader 500, together with the mobile or computing device 600 illustrated in FIG. 5, may be authenticated in the same or similar manner as the RFID reader 100 illustrated in FIG. 1 by the same or similar methods illustrated and described in reference to FIG. 2, and may allow a user to download or upload product information to the server 107 in the same or similar methods as described in reference to FIGS. 3 and 4.

In describing representative examples of the present invention, the specification may have presented the method and/or process of operating the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

We claim:

1. An RFID reader comprising:
   a memory having a first data for identifying the reader and a second data associated with the first data stored therein;
   a communication interface; and
   a microcontroller unit, wherein the microcontroller unit is configured to:
   transmit the first data via the communication interface;
   receive a first request for transmitting the second data;
   transmit the second data via the communication interface;
   receive a third data via the communication interface; and
   overwrite the second data stored in the memory with third data,
   wherein the RFID reader is associated with a unique reader identification, and the unique reader identification is associated with a secure code, and
   wherein the secure code associated with the second data is overwritten with a new secure code associated with the third data.

2. The reader of claim 1, wherein the microcontroller unit is further configured to:
   receive a second request for transmitting identification information of the reader; and
   transmit a fourth data with the first data in response to the second request, wherein the fourth data comprises at least one of a phone number and an IP address.

3. The reader of claim 1, wherein the microcontroller unit is further configured to:
   transmit a request for uploading information to a server; and
   upload the information to the server after the second data stored in the memory has been overwritten with the third data.

4. The reader of claim 1, wherein the microcontroller unit is further configured to:
   transmit a request for downloading information from a server; and
   download information from the server after the second data stored in the memory has been overwritten with the third data.

5. The reader of claim 1, wherein the communication interface is configured to communicate with a mobile communication network or the Internet.

6. The reader of claim 5, wherein the communication interface comprises an antenna or a wireless network interface or wired link.

7. The reader of claim 1, wherein the communication interface is configured to communicate with a mobile device or computing device.

8. The reader of claim 7, wherein the communication interface comprises a USB interface or a Bluetooth interface.

9. A system comprising:
   a first reader, wherein the first reader comprises a first memory having a first reader ID for identifying the first reader and a first secure code associated with the first reader ID stored therein; and
   a server, wherein the server comprises a second memory having a plurality of reader IDs and a plurality of secure codes stored therein, each reader ID is associated with one of a plurality of readers, and each secure code is associated with one of the plurality of reader IDs,
   wherein the system is configured to:
   transmit, by the reader, the first reader ID to the server;
   identify, by the server, the first reader ID from the plurality of reader IDs;
   receive, by the reader, a request for transmitting the secure code associated with the first reader ID from the server;
   transmit, by the reader, the first secure code to the server;
   determine, by the server, whether or not the first secure code matches the secure code associated with the first reader ID stored in the second memory;
   generate, by the server, a new secure code if the first secure code matches the secure code associated with the first reader ID stored in the second memory;
   transmit, by the server to the reader, the new secure code; and
   overwrite, by the reader, the first secure code with the new secure code.

10. The system of claim 9, wherein the first reader is further configured to:
    receive a request for transmitting identification information of the reader; and
    transmit a phone number or an IP address with the first reader ID in response to the request.

11. The system of claim 9, wherein the first reader is further configured to:
    transmit a request for uploading information to the server; and
    upload the information to the server after the first secure code has been overwritten with the new secure code.

12. The system of claim 9, wherein the reader is further configured to:
    transmit a request for downloading information from the server; and
    download information from the server after the first secure code stored in the memory has been overwritten with the new secure code.

13. The system of claim 9, wherein the new secure code is generated based on the first reader ID and the first secure code.

14. The system of claim 9, wherein the first reader and the server communicate over a mobile network or the Internet.

15. A server comprising:

a first module for generating secure codes; and a memory having a plurality of reader IDs and a plurality of secure codes stored therein, wherein each reader ID is associated with one of a plurality of readers, and each secure code is associated with one of the plurality of reader IDs, wherein the server is configured to:

receive a first reader ID;

identify the first reader ID from the plurality of reader IDs;

send a request for transmitting the secure code associated with the first reader ID;

receive a first secure code;

determine whether or not the first secure code matches the secure code associated with the first reader ID stored in the memory; and if the first secure code matches the secure code associated with the first reader ID stored in the memory:

generate a new secure code;

overwrite the secure code associated with the first reader ID stored in the memory with the new secure code; and transmit the new secure code.

16. The server of claim 15 is further configured to:

send a request for identification information; and receive at least one of a phone number and an IP address.

17. The server of claim 15 is further configured to:

receive a request for uploading information to the server; and grant permission for information uploading after the secure code associated with the first reader ID stored in the memory is overwritten with the new secure code.

18. The server of claim 15 is further configured to:

receive a request for downloading information from a server; and grant permission for information downloading after the secure code associated with the first reader ID stored in the memory is overwritten with the new secure code.

\* \* \* \* \*